(12) United States Patent
Narla

(10) Patent No.: US 10,992,257 B2
(45) Date of Patent: Apr. 27, 2021

(54) STATE OF HEALTH MECHANISMS FOR ENERGY GENERATION SYSTEMS

(71) Applicant: SolarCity Corporation, San Mateo, CA (US)

(72) Inventor: Sandeep Narla, San Jose, CA (US)

(73) Assignee: SolarCity Corporation, San Mateo, CA (US)

( * ) Notice: Subject to any disclaimer, the term of this patent is extended or adjusted under 35 U.S.C. 154(b) by 364 days.

(21) Appl. No.: 15/461,295

(22) Filed: Mar. 16, 2017

(65) Prior Publication Data

US 2018/0269829 A1    Sep. 20, 2018

(51) Int. Cl.
*H02S 50/10* (2014.01)
*G01R 1/00* (2006.01)
*H02S 10/00* (2014.01)

(52) U.S. Cl.
CPC .................................. *H02S 50/10* (2014.12)

(58) Field of Classification Search
CPC ............ H02S 10/00; H02S 50/10; G01R 1/00
See application file for complete search history.

(56) References Cited

U.S. PATENT DOCUMENTS

| 4,633,418 | A  | 12/1986 | Bishop |
| 7,558,701 | B2 | 7/2009  | Andarawis et al. |
| 8,204,709 | B2 | 6/2012  | Presher, Jr. et al. |
| 8,446,127 | B2 | 5/2013  | Yazami et al. |
| 2008/0147335 | A1* | 6/2008 | Adest ................. G01D 4/004 702/64 |
| 2008/0306700 | A1 | 12/2008 | Kawan et al. |
| 2009/0182532 | A1 | 7/2009 | Stoeber et al. |
| 2009/0281673 | A1* | 11/2009 | Taft ..................... G05B 15/02 700/286 |
| 2010/0152910 | A1* | 6/2010 | Taft ....................... H02H 3/042 700/286 |
| 2010/0208501 | A1* | 8/2010 | Matan .................... H02J 3/18 363/95 |
| 2011/0066401 | A1 | 3/2011 | Yang et al. |
| 2011/0259396 | A1* | 10/2011 | Hoffman .......... H01L 31/0547 136/246 |
| 2013/0069660 | A1* | 3/2013 | Bernard ............. G01R 31/367 324/430 |

(Continued)

FOREIGN PATENT DOCUMENTS

| CN | 104734362 A | 6/2015 |
| CN | 105137242 A | 12/2015 |
| JP | 2010123880 A2 | 6/2010 |

*Primary Examiner* — Jermele M Hollington
*Assistant Examiner* — Temilade S Rhodes-Vivour
(74) *Attorney, Agent, or Firm* — Dentons US LLP

(57) ABSTRACT

A method of monitoring state of health for an energy generation system includes receiving a measurement of a parameter of an electrical component in the PV energy generation system at an instance in time, referencing a look-up table containing several values of the parameter representing an expected degradation trend across a progression of time for the electrical component, comparing the measurement to an expected value of the expected degradation trend for a period of time corresponding to the instance in time, and initiating a preventative measure based upon the comparison between the measurement and the expected value of the expected degradation trend.

15 Claims, 11 Drawing Sheets

(56) References Cited

U.S. PATENT DOCUMENTS

| | | | |
|---|---|---|---|
| 2013/0212410 A1* | 8/2013 | Li | G06F 1/263 |
| | | | 713/300 |
| 2013/0229156 A1 | 9/2013 | Brandon et al. | |
| 2013/0338947 A1* | 12/2013 | John | H05B 47/00 |
| | | | 702/60 |
| 2014/0088898 A1 | 3/2014 | Lim | |
| 2014/0136178 A1* | 5/2014 | Meagher | G06F 17/5009 |
| | | | 703/18 |
| 2015/0229268 A1 | 8/2015 | Satake | |
| 2015/0249389 A1 | 9/2015 | Cummings | |
| 2015/0331972 A1* | 11/2015 | McClure | G06F 17/11 |
| | | | 703/2 |
| 2016/0238666 A1 | 8/2016 | Kelly | |
| 2017/0089804 A1* | 3/2017 | Goit | G01M 13/04 |

\* cited by examiner

|       | $T_0$       | $T_1$       | $T_2$       | $T_3$       | ... | $T_M$       |
|-------|-------------|-------------|-------------|-------------|-----|-------------|
| $P_0$ | $X_{P0T0}$  | $X_{P0T1}$  | $X_{P0T2}$  | $X_{P0T3}$  | ... | $X_{P0TM}$  |
| $P_1$ | $X_{P1T0}$  | $X_{P1T1}$  | $X_{P1T2}$  | $X_{P1T3}$  | ... | $X_{P1TM}$  |
| ⋮     | ⋮           | ⋮           | ⋮           | ⋮           |     |             |
| $P_N$ | $X_{PNT0}$  | $X_{PNT1}$  | $X_{PNT2}$  | $X_{PNT3}$  | ... | $X_{PNTM}$  |

1000

Reference LUT

| | Year 1 | Year 2 | Year 3 | Year 4 | Year 5 |
|---|---|---|---|---|---|
| 1002 — Voltage | 10V | 10.5V | 11V | 11.5V | 12V |
| 1004 — Capacitor Resistance | 1Ω | 1.5Ω | 2Ω | 2.5Ω | 3Ω |
| 1006 — Relay Resistance | 1Ω | 1.5Ω | 2Ω | 2.5Ω | 3Ω |

Measured Sensor Data

| | Year 1 | Year 2 | Year 3 | Year 4 | Year 5 |
|---|---|---|---|---|---|
| Voltage | 9.7V | 10.1V | 10.8V | 11.7V | 13V |
| Capacitor Resistance | 0.9Ω | 1.4Ω | 2.4Ω | 3.4Ω | |
| Relay Resistance | 0.8Ω | 1.1Ω | 1.4Ω | 1.9Ω | 2.4Ω |

*FIG. 10B*

STATE OF HEALTH MECHANISMS FOR ENERGY GENERATION SYSTEMS

BACKGROUND

In recent years, climate change concerns, reduction in costs, governmental initiatives, and other factors have driven a rapid rise in the adoption of renewable energy generation systems (i.e., systems that generate energy using renewable resources such as solar, wind, fuel cells, geothermal etc.) at residential and non-residential sites. Solar energy generation systems, in particular, have been very popular due to numerous advantages over other renewable and non-renewable energy sources.

Solar energy generation systems include photovoltaic (PV) modules that generate power from the sun, and can provide the generated power to a utility grid or to one or more on-site loads. Some solar energy generation systems can store energy from the PV and/or utility grid in a battery for future use, and can receive power from the utility grid and re-route power to the one or more loads without having to use power generated from the sun or from energy stored in the battery.

As with any electrical system, continuous use causes solar energy generation systems to degrade over time. Once systems degrade to a certain point, the system can fail to operate, reducing the solar value proposition and necessitating complex troubleshooting and costly repairs. Troubleshooting solar energy generation systems can be substantially onerous given the large number of electrical components utilized in a typical energy generation system. Furthermore, initiating repairs of an energy generation system once it has already failed may result in large system downtime until it is repaired. Thus, improvements to the reliability of solar energy generation systems are desired.

SUMMARY

Various embodiments of the disclosure provide methods and systems for monitoring a degradation trend of an energy generation system to identify potential failures before they occur. Sensors can be strategically positioned to monitor critical electrical components in an energy generation system. Measurements collected by the sensors can be compared to a look-up table containing values representing an expected degradation rate of the respective electrical component. Determinations made from the comparison can be used to initiate preventative measures prior to electrical component failure. By initiating preventative measure prior to failure, such energy generation systems can minimize failure occurrences and system downtime.

In some embodiments a method of determining a state of health for a photovoltaic (PV) energy generation system includes receiving a measurement of a parameter of an electrical component in the PV energy generation system at an instance in time; referencing a look-up table containing several values of the parameter representing an expected degradation trend across a progression of time for the electrical component; comparing the measurement to an expected value of the expected degradation trend for a period of time corresponding to the instance in time; and initiating a preventative measure based upon the comparison between the measurement and the expected value of the expected degradation trend.

In certain embodiments, the progression of time includes a plurality of periods of time. The method can further include: based on the step of comparing, determining that the measurement indicates that the electrical component is degrading faster than expected; calculating a difference between the measurement and the expected value; and comparing the difference to a threshold value. The preventative measure can be a first action when the difference is less than the threshold value, and a second action when the difference is greater than the threshold value. The second action can be different than the first action. The first action can include sending a warning notification. The first action can include modifying an operation of the electrical component to mitigate its degradation. The second action can include sending a notification. The second action can include modifying an operation of the electrical component to cease operation of the electrical component or a portion of the energy generation system that uses the electrical component. The electrical component can be part of an inverter or an energy storage device for the energy generation system. The expected degradation trend can include a progression of more than one period of time.

In some embodiments, a photovoltaic (PV) energy generation system includes an inverter configured to receive direct current (DC) power from a PV module, the inverter comprising: circuitry configured to convert between DC and alternating current (AC) power; electrical components for enabling the circuitry to convert between DC and AC power; one or more sensors coupled to the electrical components for monitoring a parameter of each electrical component; and a state of health mechanism coupled to the inverter, the state of health mechanism comprising: a processor coupled to the one or more sensors and configured to receive sensor information from the one or more sensors; and memory coupled to the processor; the memory containing instructions that, when executed, causes the processor to: receive a measurement of a parameter of an electrical component in the PV energy generation system at an instance in time; reference a look-up table containing several values of the parameter representing an expected degradation trend across a progression of time for the electrical component; compare the measurement to an expected value of the expected degradation trend for a period of time corresponding to the instance in time; and initiate a preventative measure based upon the comparison between the measurement and the expected value of the expected degradation trend.

The state of health mechanism can be incorporated within a housing of the inverter. The state of health mechanism can be incorporated within a device separate from the inverter. The progression of time can include a plurality of periods of time. The memory can further cause the processor to: determine that the measurement indicates that the electrical component is degrading faster than expected; calculate a difference between the measurement and the expected value; and compare the difference to a threshold value. The preventative measure can be a first action when the difference is less than the threshold value, and a second action when the difference is greater than the threshold value.

In some embodiments, a computer product for a photovoltaic (PV) energy generation system comprising a non-transitory computer readable medium storing a plurality of instructions that when executed control a device including one or more processors, the instructions comprising: receiving a measurement of a parameter of an electrical component in the PV energy generation system at an instance in time; referencing a look-up table containing several values of the parameter representing an expected degradation trend across a progression of time for the electrical component; comparing the measurement to an expected value of the expected degradation trend for a period of time corresponding to the instance in time; and initiating a preventative measure based upon the comparison between the measurement and the expected value of the expected degradation trend.

The progression of time can include a plurality of periods of time. The memory can further cause the processor to: determine that the measurement indicates that the electrical component is degrading faster than expected; calculate a difference between the measurement and the expected value; and compare the difference to a threshold value.

A better understanding of the nature and advantages of embodiments of the present invention may be gained with reference to the following detailed description and the accompanying drawings.

BRIEF DESCRIPTION OF THE DRAWINGS

FIGS. 10A-10B are diagrams illustrating an exemplary look-up table and measurements of electrical components for a hypothetical situation, according to some embodiments of the present disclosure.

DETAILED DESCRIPTION

Solar energy generation systems according to embodiments of the disclosure can monitor their own electrical components to anticipate when an electrical component is likely to fail and initiate actions to prevent its failure. In such energy generation systems, a plurality of sensors can be strategically positioned to monitor critical electrical components. Measurements collected by the sensors can be compared to a look-up table containing values representing an expected degradation rate of the respective electrical component and be used to initiate preventative measures prior to electrical component failure. By initiating preventative measures prior to failure, such energy generation systems can minimize failure occurrences and system downtime.

I. PV Systems

A solar energy generation system includes an energy generation device, e.g., an array of PV modules connected together on one or more strings, for generating DC power from the sun, one or more PV string inverters for converting the DC power from the strings to AC power, and physical interfaces for feeding into the utility grid and/or off-grid outputs—typically on the load side of the utility meter, between the meter and the customer's main electrical panel. The solar energy generation system provides excess AC power/energy back to the utility grid, resulting in cost benefits to the customer or resulting in a source of grid services. The solar energy generation system can also route power from the utility grid to one or more loads through the inverter at the customer site separated in a back-up load panel. There are two types of energy generation systems: an AC-coupled energy generation system and a DC-coupled energy generation system.

Figure 1:
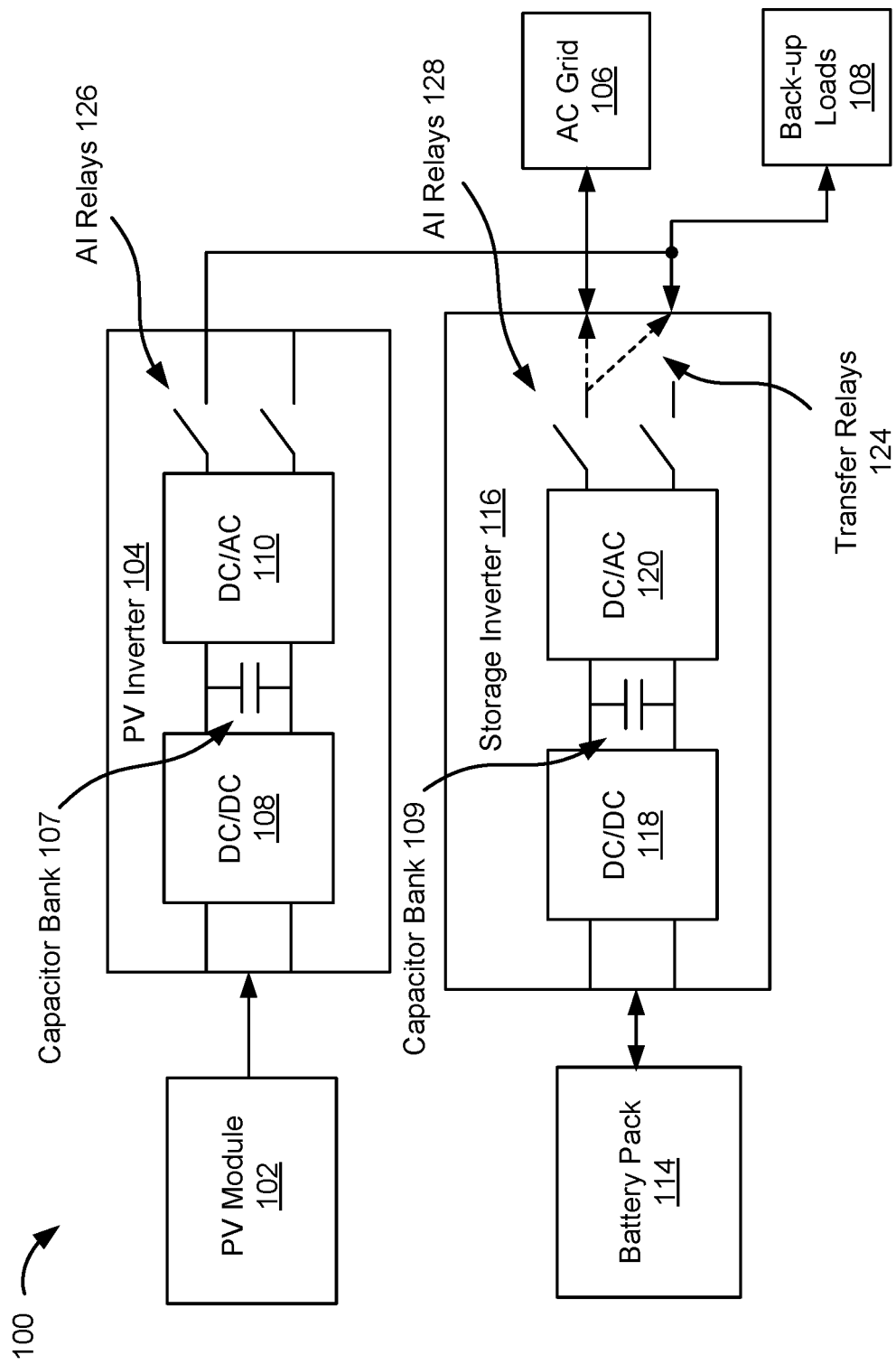
FIG. 1 is a block diagram illustrating a conventional AC-coupled energy storage system.

FIG. 1 illustrates a block diagram of AC-coupled energy storage system 100. The energy generation system is called an AC-coupled energy generation system because a PV inverter and a storage inverter are coupled at the AC side of each inverter. As shown, AC-coupled energy storage system 100 is a PV system that includes PV modules 102 for generating DC power and PV grid-tied string inverter 104 for converting the generated DC power to AC power for feeding into AC utility grid 106 at the interface for back-up loads 108. PV modules 102 can be one or more modules, such as array(s)/strings of PV modules, capable of generating DC voltage from photons emitted from a light source such as the sun. Inverter 104 may include DC-to-DC (buck and/or boost) converter 108 for stepping up/down the received DC power from PV module 102 to a suitable level for inversion, and DC-to-AC inverter 110 for converting the DC power to AC power for outputting to AC grid 106. Inverter 104 may also include capacitor bank 107 or other energy reservoir coupled between the DC-to-DC converter 108 and DC-to-AC inverter 110 for power stabilization purposes. In some embodiments, the DC-to-DC conversion may take place on the roof in the form of DC optimizers. In certain embodiments where strings of PV modules are long enough to provide voltage levels high enough for conversion on their own, only a DC-to-AC inverter may be implemented in PV system 100. Alternatively, micro-inverters may be used for every module or every N modules (typically 1-4), instead of PV string inverter 104.

PV system 100 may also include battery pack 114 for storing and discharging power/energy into the grid or to on-site loads. Battery pack 114 may be any lead-acid or advanced lead-acid battery, lithium-ion or flow battery, organic battery pack, or the like. Power discharged from battery pack 114 may be provided to storage inverter 116. Storage inverter 116 may include DC-to-DC converter 118 for stepping up/down DC voltage provided by battery pack 114 to a suitable level for inversion during charging/discharging processes. DC-to-DC converter 118 may be a buck and/or boost converter that is implemented when battery pack 114 does not include a separate DC-to-DC buck and/or boost converter. In some embodiments, DC-to-DC converter 118 may still be required in storage inverter 116 if the DC-to-DC buck and/or boost converter inside battery pack 114 is not sufficient to match the conversion voltage of storage inverter 116. Storage inverter 116 may also include DC-to-AC inverter 120 for converting the DC power from battery pack 114 to AC power for outputting to AC grid 106 or one or more back-up loads 108. Storage inverter 116 may also include capacitor bank 109 coupled between power lines routing power from DC-to-DC converter 118 to DC-to-AC inverter 120 for power stabilization purposes. Anti-islanding relays 126 and 128 may be implemented within PV inverter 104 and storage inverter 116, respectively, to direct power between inverters 104 and 116 and AC grid 106. Transfer relays 124 may be implemented within storage inverter 116 to direct power between inverter 116 and either AC grid 106 or back-up loads 108. In various embodiments, when transfer relays 124 are in a first position, storage inverter 116 may provide power to or receive power from AC grid 106, and when transfer relays are in a second position, storage inverter 116 may provide power to back-up loads 108 in off-grid (voltage source) operation, e.g., when the utility grid is not available. In the second position, the PV inverter may provide AC power to the storage inverter to charge the battery through the back-up loads interface.

Figure 2:
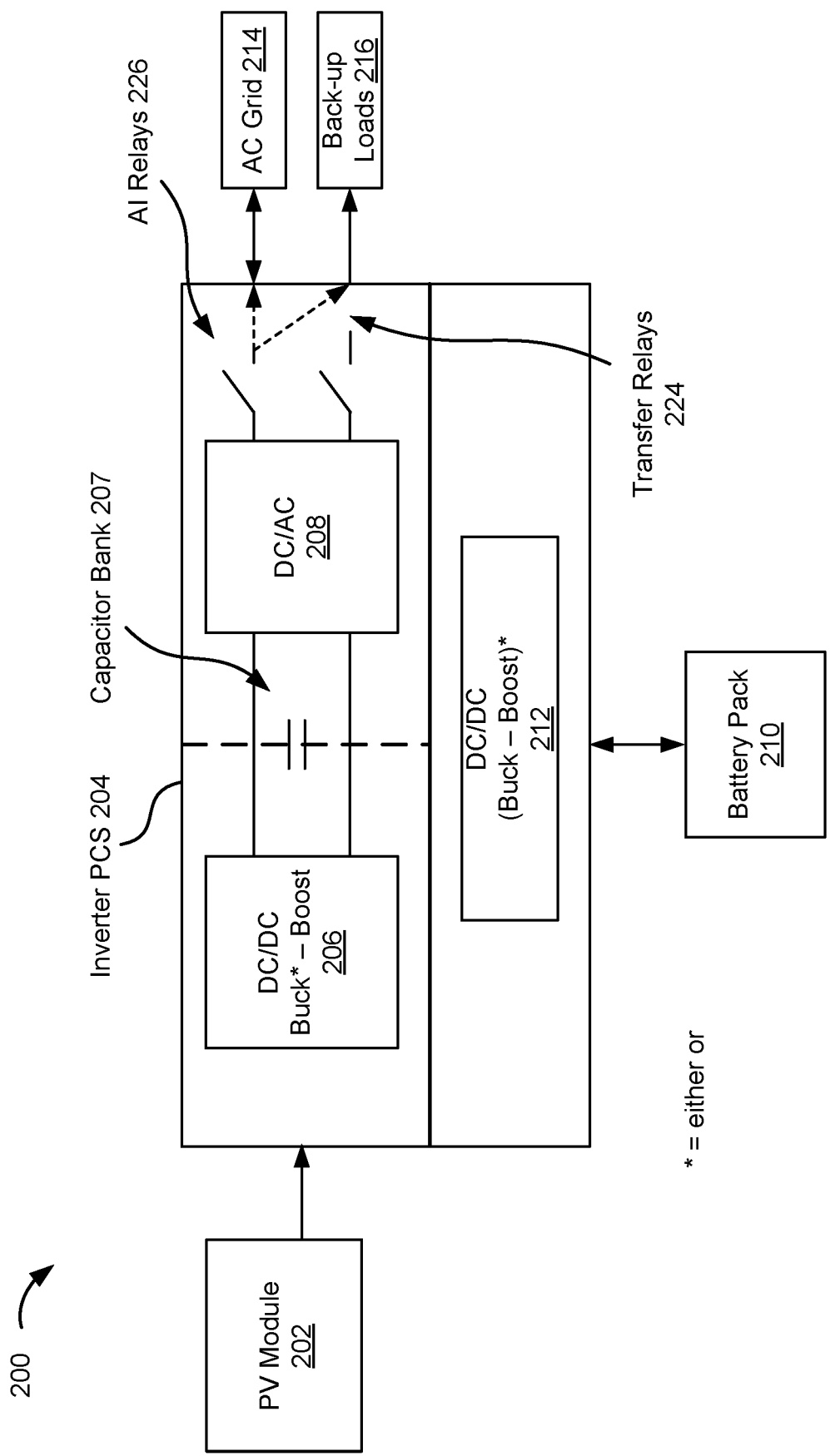
FIG. 2 is a block diagram illustrating a conventional DC-coupled energy storage system.

Another newer type of PV system is a DC-coupled energy storage system as shown in FIG. 2, which illustrates a block diagram of DC-coupled energy storage system 200. This energy generation system is called a DC-coupled energy generation system because the battery pack and PV module(s) output are coupled to the DC side of an inverter. DC-coupled energy storage system 200 is a PV system that includes one or more PV modules 202 for generating DC power and inverter power control system (PCS) 204 for converting the generated DC power to AC power for outputting to AC grid 214 or to supply to on-site back-up loads 216. Instead of having two separate inverters, as shown in FIG. 1, system 200 may only have a single inverter PCS that is configured to control the flow of power between DC sources, e.g., PV module 202 and battery pack 210, and AC output destinations, e.g., AC grid 214 and back-up loads 216. Similar to transfer relays 124 in FIG. 1, transfer relays 224 may control which output destination will receive power from inverter PCS 204. In various embodiments, when transfer relays 224 are in a first position, inverter PCS 204 may provide power to or receive power from AC grid 214, and when transfer relays 224 are in a second position, inverter PCS 204 may provide power to back-up loads 216. Anti-islanding relays 226 may be implemented within PV inverter PCS 204 to direct power from/to AC grid 214.

Inverter PCS 204 may include DC-to-DC (buck and/or boost) converter 206 for ensuring that the voltage provided to DC-to-AC inverter 208 is sufficiently high for inversion. In some embodiments, the DC-to-DC conversion may take place on the roof in the form of DC optimizers. In certain embodiments where strings of PV modules are long enough to provide voltage levels high enough for conversion on their own, only a DC-to-AC inverter may be implemented in PV system 200. Inverter PCS 204 also includes a DC link bus attached to battery pack 210 so that the DC power coming from PV module 202 can be used to deliver DC power to battery pack 210. The DC link bus is represented by capacitor bank 207 shown between the two DC-to-DC converters 206 and 212 and DC-to-AC inverter 208 in FIG. 2. Battery pack 210 may have a minimum and maximum associated operating voltage window. Because battery pack 210 has a maximum exposed input voltage limit that, in many cases, may be lower than the theoretical maximum DC voltage coming off of the PV strings (combined open circuit voltage of each module), a buck-boost circuit 206 or 212 may be implemented between the string-level PV input of inverter PCS 204 and the DC-link connection to battery pack 210. The inclusion of buck-boost circuit 206 or 212 will prevent battery pack 210 from being exposed to voltages above a safe threshold, thereby eliminating the possibility of damage to battery pack 210 from overvoltage stress. For instance, when DC-to-DC converter 206 is only a boost converter, then DC-to-DC converter 212 may be a buck-boost converter for preventing battery pack 210 from overvoltage stress and providing flexibility in operating voltage range. However, if DC-to-DC converter 206 is a buck and boost converter, then DC-to-DC converter 212 may not be needed. Further details of energy generation system 200 and an inverter PCS can be referenced in U.S. patent application Ser. No. 14/798,069, filed on Jul. 13, 2015, entitled "Hybrid Inverter Power Control System for PV String, Battery, Grid and Back-up Loads," where is herein incorporated by reference in its entirety for all purposes Back-up loads, e.g., back-up loads 108 and 216 in FIGS. 1 and 2, respectively, discussed herein above may be an entire set, or a subset of the entire set, of loads for a customer site. For instance, back-up loads may be certain loads that are considered to be more important that other loads during power outage. As an example, for a residential customer site, back-up loads may be a refrigerator, air conditioning unit, heater unit, and/or other important loads, whereas loads that are not considered back-up loads, but are still part of the entire set of loads, include loads such as a television set, desk lamp, nightstand light, and the like. For a commercial customer site, back-up loads may be a server bay, information technology infrastructure devices, and other loads important for business sustainability during a power outage, whereas loads that are not considered back-up loads 108 and 216 may be hallway lights, bathroom lights, desk lamps, and the like. In some embodiments, back-up loads may be included in a main panel (not shown) that houses connections for the entire set of loads for a customer site. In other embodiments, back-up loads may be included in a separate load panel (not shown) beside the main panel.

Solar energy generation systems typically follow a manufacturer's scheduled maintenance plan to maximize their useful lifetime. These maintenance plans are designed according to a general failure rate of one or more electrical components in the energy generation system. The problem with just following these maintenance plans is that not all electrical components degrade at the same rate. That is, some electrical components may degrade faster than others and thus cause the energy generation system to prematurely fail even though they have been properly maintained according to the manufacturer's maintenance plan.

II. PV Energy Generation System With a State of Health Mechanism

According to embodiments of the present disclosure, a solar energy generation system is implemented with a state of health (SOH) mechanism to strategically monitor crucial electrical components and initiate preventative measures before failure of those electrical components. One or more sensors can be positioned to monitor one or more parameters of the electrical components and generate measurements of the monitored parameters. The measurements can then be outputted to a processor. The processor can compare the measurements to a look-up table and determine whether the rate at which the electrical component is degrading is faster than the expected rate specified in the look-up table. If so, the state of health mechanism can then initiate preventative measures, such as sending out a notification to a technician or by modifying an operation of the energy generation system. Modification of an energy system can include changing an operation of an electrical component in a way that mitigates the degradation of the electrical component to extend its lifetime until it is replaced, as will be discussed in further detail herein.

Figure 3:
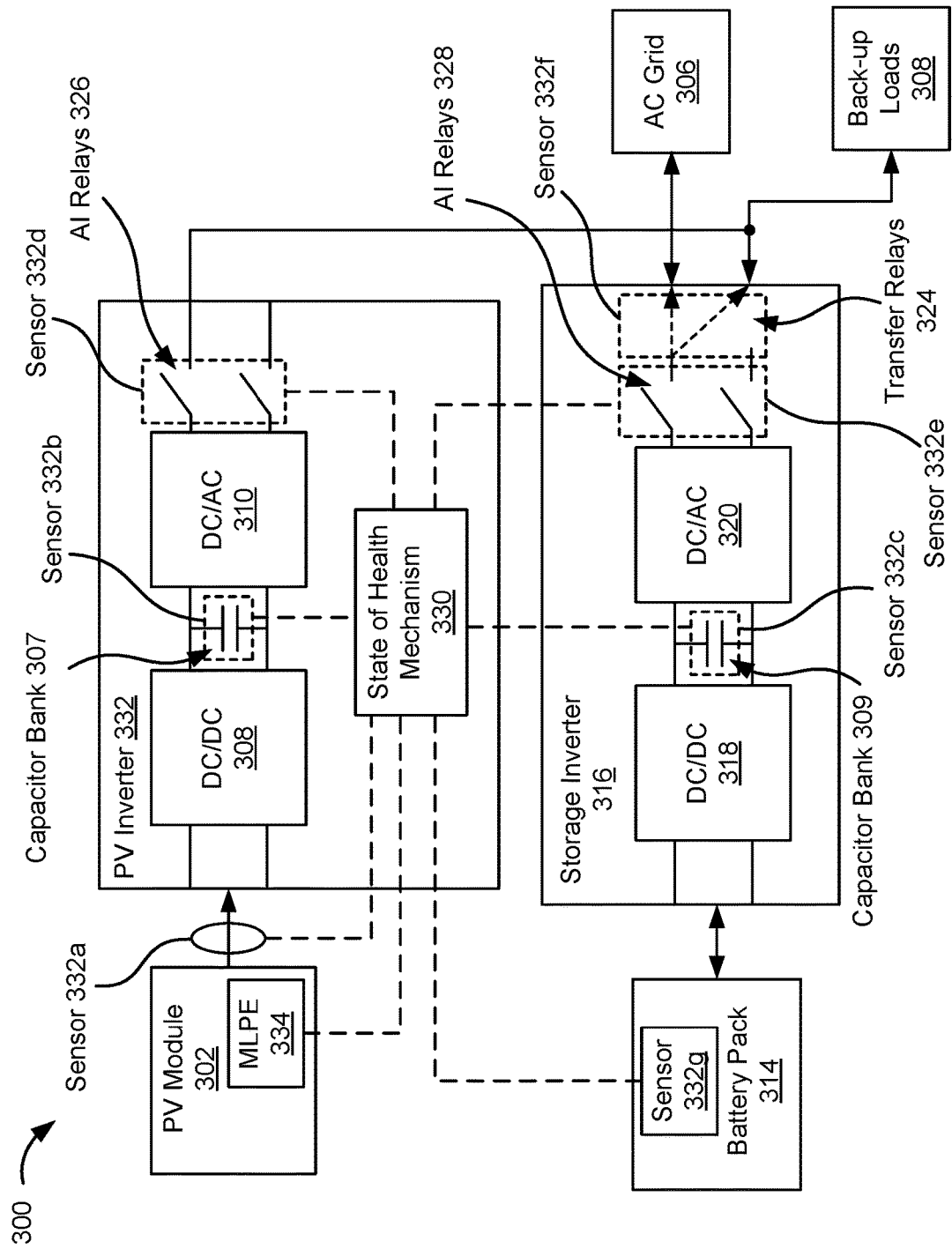
FIG. 3 is a block diagram illustrating an exemplary AC-coupled solar energy generation system with a state of health mechanism, according to some embodiments of the present disclosure.
Figure 4:
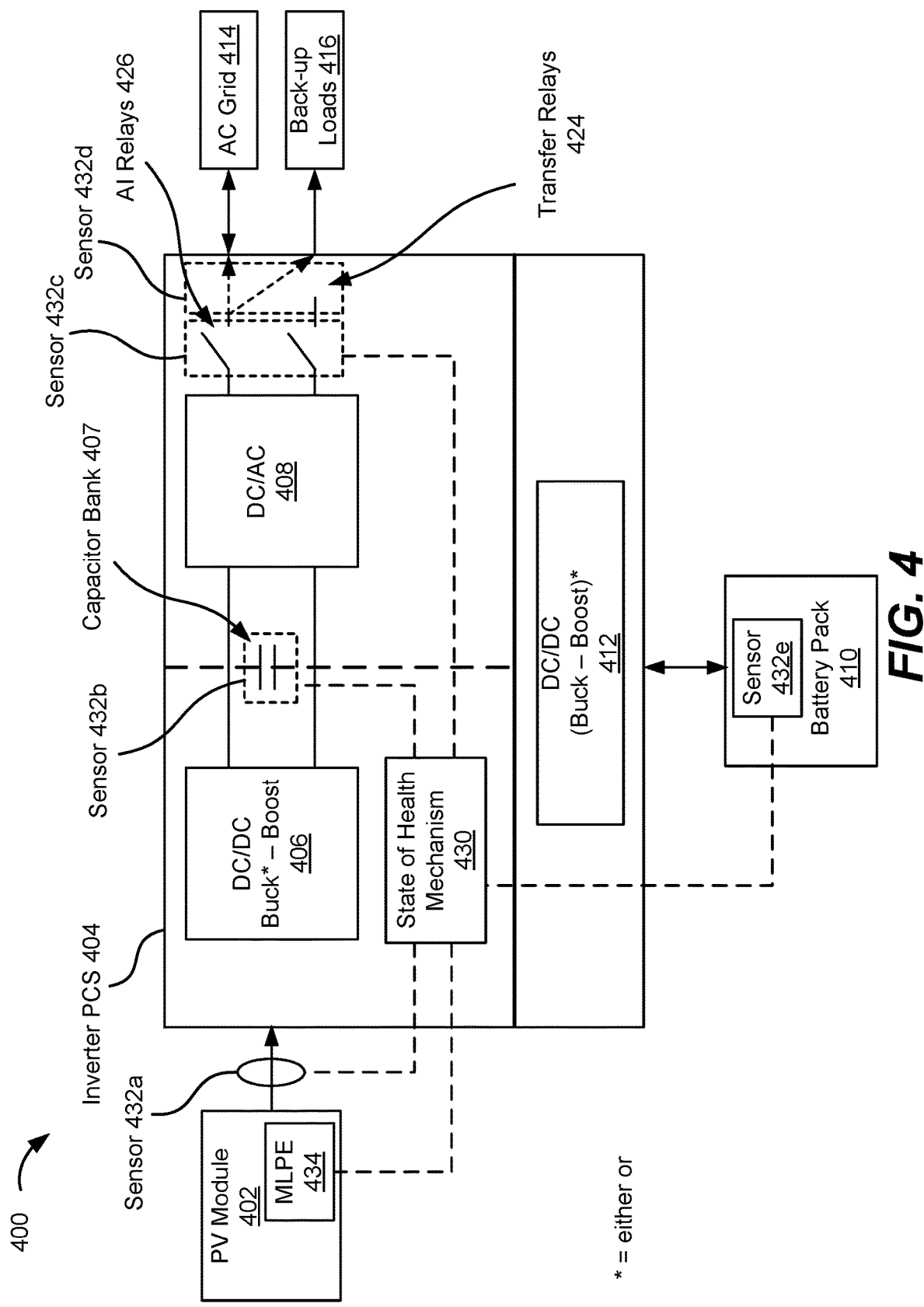
FIG. 4 is a block diagram illustrating an exemplary DC-coupled energy storage system with a state of health mechanism, according to some embodiments of the present disclosure.

FIGS. 3 and 4 illustrate exemplary AC-coupled solar energy generation system 300 and DC-coupled solar energy generation system 400 with state of health mechanisms 330 and 430 and sensors 332a-332g and 432a-432e, respectively, according to embodiments of the present disclosure. Electrical components shared with energy generation systems 100 and 200 have the same purpose and operation as their counterparts in energy generation systems 100 and 200. Discussions of their purposes and operations are omitted in this section to avoid redundancy. Thus, details of the shared electrical components should be referenced in the discussion of FIGS. 1 and 2 aforementioned herein.

A. Sensors

As mentioned herein, energy generation systems 300 and 400 may each include one or more sensors 332a-332g and 432a-432e, respectively. Each sensor 332a-332g and 432a-432e may be strategically positioned and/or designed to monitor a parameter of a respective electrical component. The monitored parameter can be any suitable parameter indicative of the health of the electrical component. For example, sensors 332a and 432a can be voltage, current, or temperature sensors configured to monitor parameters (e.g., voltage output, current output, or temperature) of respective PV modules 302a and 402a. The amount of voltage or current provided by PV modules 302 and 402 can be indicative of the health of the PV modules. For instance, if one or more of the output voltage, current, or temperature is at a level that matches an expected value, then it can be concluded that the respective PV module is healthy (e.g., not excessively degraded). Otherwise, if the output voltage and/or current is at a level that is lower than the expected value or the temperature is at a level higher than the expected value, then it can be concluded that the respective PV module is not healthy (e.g., excessively degraded) because the PV module is not outputting an expected amount of power or is too hot.

Although FIG. 3 shows that a separate sensor 332a or 432a can be positioned external to PV module 302 and 402, respectively, embodiments are not limited to such embodiments. In some instances, sensor circuits can be implemented within PV module 302/402, such as in instances where PV module 302/402 includes module-level power electronics (MLPE) 334 (e.g., optimizers or micro-inverters). In these instances, the MLPE can monitor the health of PV module while incorporated within the PV module and without requiring an additional sensor (i.e., sensor 332a).

Figure 5:
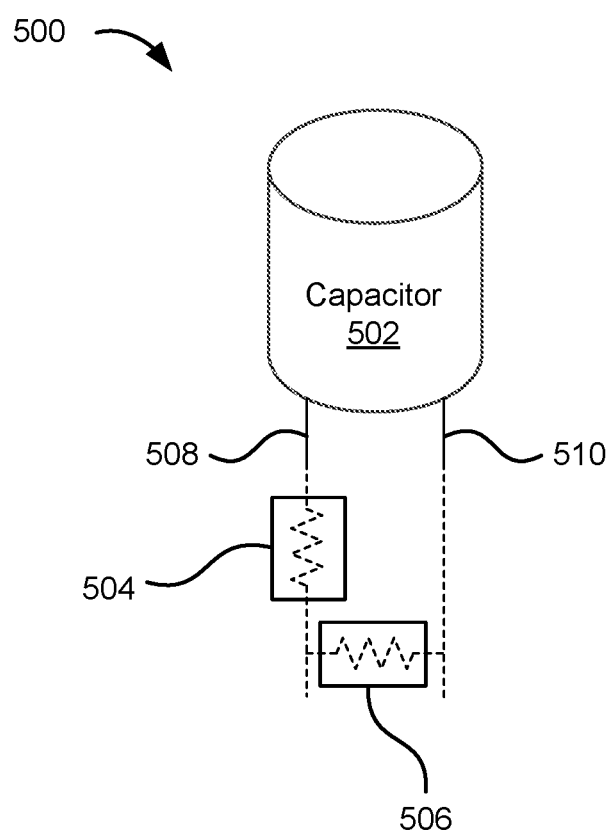
FIG. 5 is a simplified diagram illustrating exemplary sensor arrangements for a capacitor in an energy generation system, according to some embodiments of the present disclosure.

Other sensors, as shown in FIGS. 5-9, can serve similar functions to determine the health of other electrical components. For example, sensors 332b and 332c in FIG. 3 and sensor 432b in FIG. 4, can be sensors designed to measure one or more parameters of capacitor bank 307 and 309, respectively, to determine a health of the capacitor bank. FIG. 5, illustrates an exemplary sensor arrangement 500 for measuring a health of a capacitor 502. Although capacitor 502 appears to be a cylindrical capacitor, it is to be appreciated that the capacitor shown is merely exemplary and non-limiting, and that any other type, shape, or form of capacitor can be used, such as an electrolytic capacitor or a film capacitor in a square or rectangular shape. To determine the health of capacitor 502, sensors 504 and/or 506 can be coupled to one or both leads 508 and 510 of capacitor 502. Sensor 504 can measure the series resistance through lead 508 to detect the amplitude of current ripple from power outputted by capacitor 502. A large amplitude can indicate that capacitor 502 is not healthy and near the end of its lifetime. Sensor 506 can measure the resistance across leads 508 and 510. As capacitor 502 degrades, the resistance value across leads 508 and 510 can gradually increase. Thus, resistance values across leads 508 and 510 that are higher than expected values may indicate that capacitor 502 is excessively degrading or prone to failure.

Figure 6A:
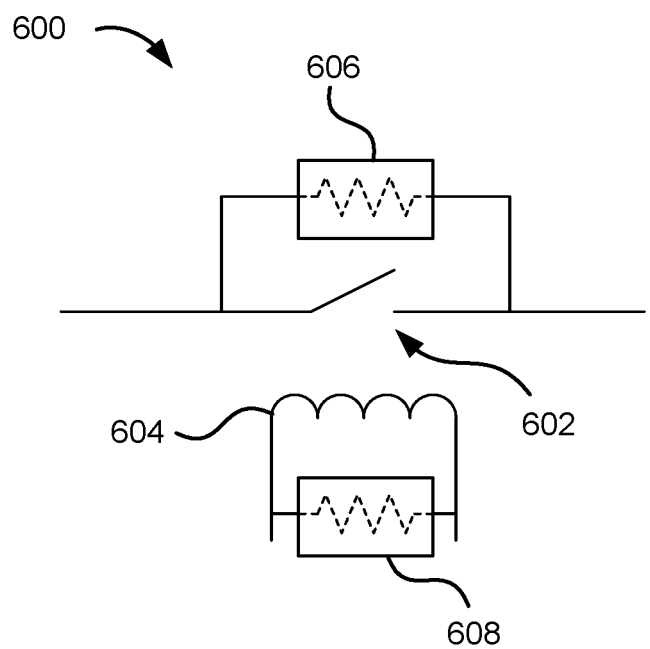
FIGS. 6A-6B are simplified diagrams illustrating an exemplary sensor arrangement for switches and relays in an energy generation system, according to some embodiments of the present disclosure.

With reference back to FIG. 3, sensors 332d-f, and 432c-d can be configured to monitor parameters of respective AI relays and transfer relays. For instance, sensors 332d-f, and 432c-d can monitor the resistance across respective switches and/or monitor the resistance across an activating element, such as an inductor, as shown in FIG. 6A. FIG. 6A illustrates an exemplary AI relay 600 including a switching element 602. Although FIG. 6 only shows one switching element, one skilled in the art appreciates that relay 600 can include more than one switching element as shown in FIGS. 3 and 4. In some embodiments, switching element 602 can be an electro-mechanical switch that utilizes an activating element 604 to open and close a circuit, such as an inductor 604. When activated, activating element 604 can electrically stimulate switching element 602 to mechanically open/close the circuit. Sensors 606 and 608 can be implemented to monitor a resistance of switching element 602 and activating element 604. The amount of measured resistance can be indicative of the health of the switching/activating element. For instance, if the resistance across switching element 602 is at a level that matches or is less than an expected value, then it can be concluded that AI relay 600 is healthy; otherwise, if the resistance is at a level that is higher than the expected value, then it can be concluded that AI relay 600 is not healthy (e.g., excessively degraded).

Figure 6B:
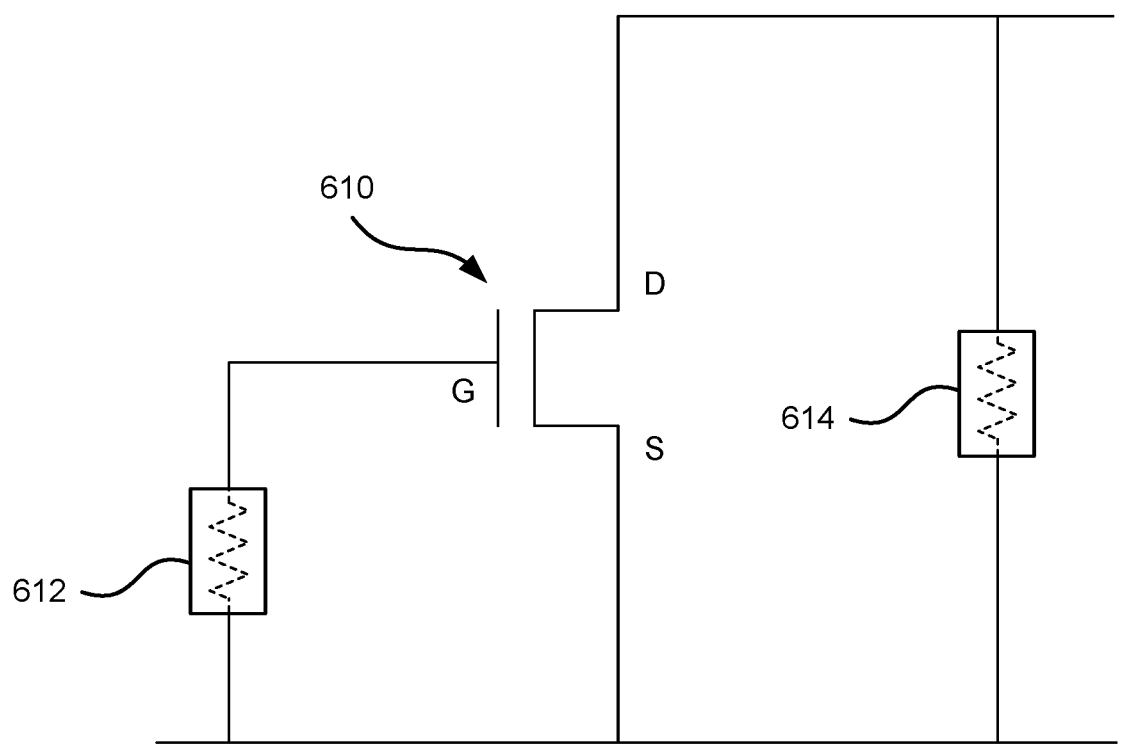

In other embodiments, switching element 602 can be an electrical switch (e.g., metal oxide semiconductor field effect transistor (MOSFET), bipolar junction transistor (BJT), and the like) that utilizes a voltage across a gate to electrically open/close the circuit without mechanical actuation. In such instances, more than one sensor can be implemented to monitor a health of switching element 602, as shown in FIG. 6B. FIG. 6B illustrates an exemplary relay including an electrical switching element 610. As shown, electrical switching element 610 is a MOSFET having a gate G, source S, and drain D. To monitor the health of switching element 610, a gate resistance ($R_G$) and/or a source-drain resistance ($R_{SD}$) can be monitored via sensors 612 and 614, respectively. In addition to resistance, sensors 612 and 614 can monitor other parameters of switching element 610, such as operating voltages required to activate switching element 610. Measured resistance and voltage values that are higher than expected resistance and voltage values may indicate that switching element 610 is not healthy.

Figure 7:
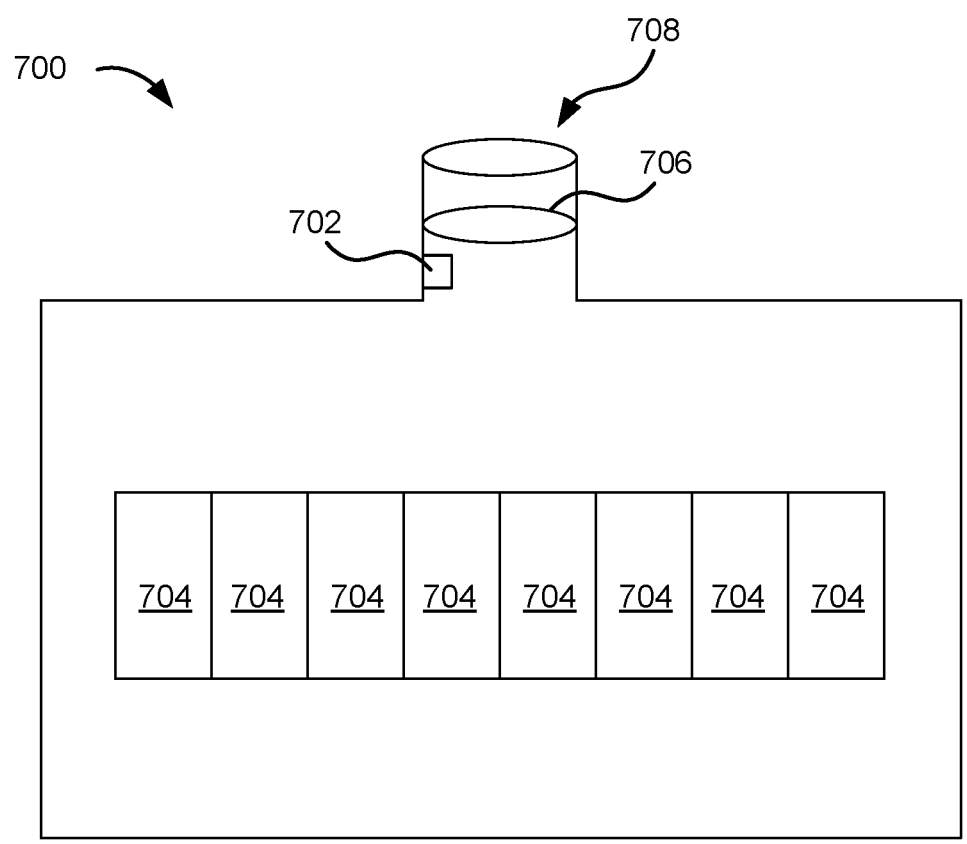
FIG. 7 is a simplified diagram illustrating exemplary sensor arrangements for a battery in an energy generation system, according to some embodiments of the present disclosure.

In addition to sensors 332a-f and 432a-d for monitoring PV modules, capacitors, and relays, sensors 332g and 432e in FIGS. 3 and 4, can be implemented to monitor the health of batteries. FIG. 7 illustrates an exemplary battery 700 having one or more sensors 702 for determining the health of battery pack 700. Battery pack 700 can include a plurality of cells 704 that can be formed of any suitable electrochemical type, such as a lead-acid, advanced lead-acid, lithium-ion, flow battery, and the like. After continued use, cells 704 may start to wear down and emit gasses as a byproduct of electrochemical reactions occurring in the cells. The quantity of these gasses can be detected by sensor 702 and function as a proxy for the health of battery 702. Levels of gases higher than expected values may indicate that battery 700 is wearing down faster than normal and is thus not healthy. Additionally, sensors 702 can detect the number of particles in the air that passes through sealant 706 into battery 700 through opening 708. Detecting a number of particles greater than an expected number can indicate that sealant 706 is degrading faster than normal. Thus, sensor 702 can be any suitable gas vapor sensor and/or air particle counter to measure the health of battery 700.

Figure 8:
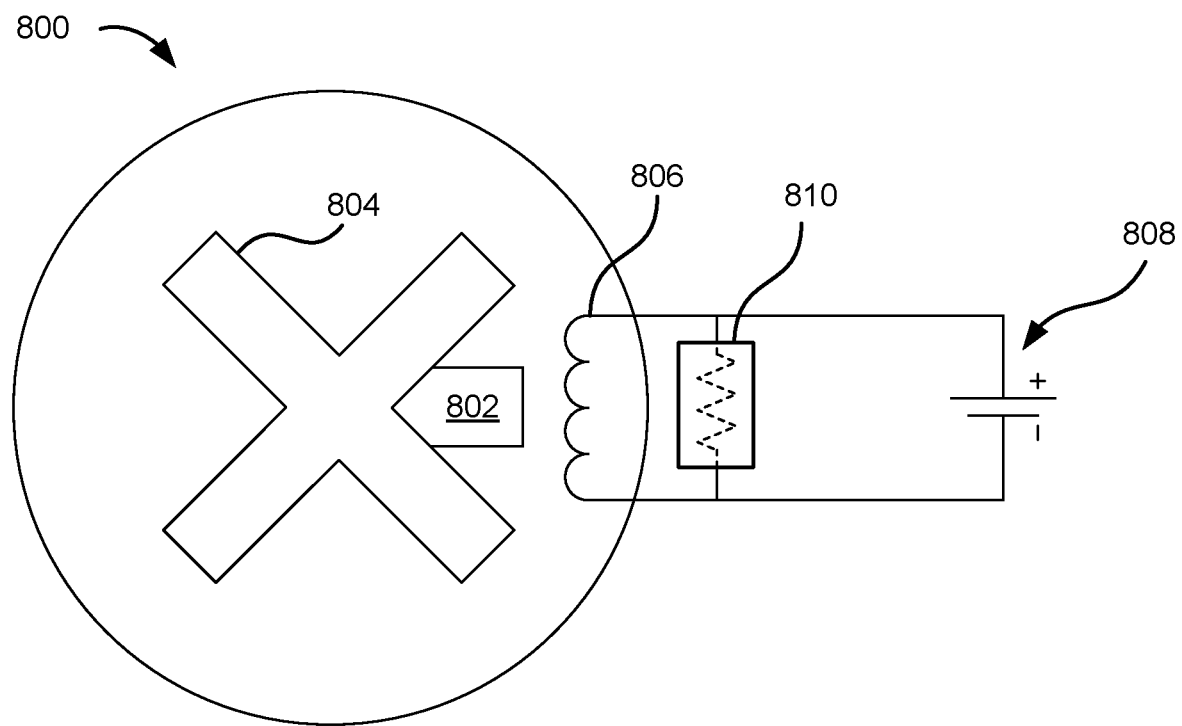
FIG. 8 is a simplified diagram illustrating exemplary sensor arrangements for a fan in an energy generation system, according to some embodiments of the present disclosure.

Although FIGS. 3 and 4 illustrate energy systems having only sensors 332a-g and 432a-e for monitoring electrical components, such as PV modules, capacitors, relays, and batteries, it is to be appreciated that any type of sensors can be implemented in the energy generation systems to monitor other electrical components, and that the number and type of sensors discussed herein with respect to FIGS. 3-7 are not limiting. As an example, sensors can be implemented to monitor an operation of one or more fans in an energy generation system. FIG. 8 illustrates an exemplary fan 800 having a sensor 810 for monitoring the health of fan 800. Fan 800 can be implemented anywhere in an energy generation system that needs cooling. During operation, motor 802 can spin blades 804 to generate airflow. Motor 802 can be powered by a power source 808 via inductor coil 806, which can be part of a power transformer or any other suitable power transfer apparatus. Sensor 810 can be positioned and configured to measure a resistance across inductor coil 806 to measure the efficiency at which power is being transferred to motor 802. Measured resistances higher than an expected value can indicate that fan 800 is unhealthy (i.e., degrading at a faster rate than expected).

According to embodiments of the present disclosure, sensors implemented in an energy generation system can be coupled to a state of health mechanism, e.g., state of health mechanisms 330 and 430 in FIGS. 3 and 4, for monitoring the status of various electrical components of the energy generation system and initiating preventative measures when one or more of those electrical components degrade past a predetermined state, as will be discussed in more detail further herein B. State of Health Mechanism A state of health mechanism (SOH) can be any suitable electrical device configured with at least a processor and a memory containing instructions for receiving measurements from a plurality of sensors, e.g., sensors 332a-g and 432a-e, and causing the processor to use the received measurements to initiate preventative measures in instances where one or more electrical components are degrading past a predetermined expected rate. In some embodiments, state of health mechanism 330 can contain a look-up table that is populated with values representing an expected degradation rate of a respective electrical component of an energy generation system, an example of which is shown in FIG. 9 herein.

Figure 9:
FIG. 9 is a diagram illustrating an exemplary generic look-up table, according to some embodiments of the present disclosure.

FIG. 9 illustrates an exemplary look-up table (LUT) 900, according to some embodiments of the present disclosure. LUT 900 can be stored in memory within state of health mechanism 330 and be referenced by a processor to determine whether preventative measures need to be initiated. As shown in FIG. 9A, LUT 900 can include several rows and columns. The rows of LUT 900 can include values of certain parameters (e.g., $P_0$-$P_N$ for N number of different parameters measured by sensors discussed herein with respect to FIGS. 3-8) across various columns representing values across a trend, such as progression of time (e.g., $T_0$-$T_M$ for M periods of time). Values (e.g., $X_{PT}$ ranging from $X_{P0T0}$ to $X_{PNTM}$) populated in LUT 900 can represent an expected value or state of health for respective electrical components across the progression of time for each respective measured parameter. In some embodiments, LUT 900 can be populated by one or more manufacturers for one or more electrical components to establish an expected degradation rate of the electrical components. The manufacturer can use its knowledge of its manufactured electrical component to populate the expected values in the rows of LUT 900. Once populated, LUT 900 can be compared with measurements collected by sensors in the energy generation system to determine whether preventative measures should be initiated.

To better illustrate how a LUT is implemented, FIGS. 10A and 10B illustrate exemplary LUT 1000 and an exemplary table 1001 of collected measurements. Measurements in table 1001 can be compared with exemplary LUT 100 for determining whether preventative measures should be initiated. LUT 1000 includes columns representing a trend in time ranging from year 1 to year 5, and rows of parameters for various electrical components. As shown in FIG. 10A, a row 1002 of LUT 1000 may represent voltage readings of an electrical component, such as a gate voltage of a MOSFET switch used for an AI relay, another row 1004 of LUT 1000 may represent a resistance across capacitor leads in an inverter, and yet another row 1006 of LUT 1000 may represent a resistance of a relay, such as a transfer relay.

Respective manufacturers of the electrical components may establish the expected degradation rate of their respective electrical component. For instance, the manufacturer of the MOSFET switch may establish that the gate voltage required to activate the MOSFET after a year of use may be 10V and degrade at a rate of 0.5V each year thereafter. Additionally, the manufacturers of the capacitor and the transfer relay may establish that the resistance across the capacitor's leads and the resistance across the transfer relay switch after a year of use may be 1Ω and degrade at a rate of 0.5Ω each year thereafter. Although LUT 1000 in FIG. 10A only illustrates the expected degradation trend for three electrical components across a period of 5 years, it is to be appreciated that the LUT configuration is merely exemplary and not intended to be limiting. Other LUTs can include different time periods split amongst different time intervals and can include degradation trends for more or less parameters for more or less electrical components.

According to embodiments of the present disclosure, measurements from sensors (e.g., sensors 332a-g and 432a-e in FIGS. 3 and 4, respectively) strategically positioned throughout an energy generation system can be compared to corresponding expected values in LUT 1000 by a state of health mechanism, e.g., state of health mechanism 330 and 430 in FIGS. 3 and 4, respectively. If the measured value indicates that the electrical component has degraded more than the expected state of health for the corresponding time period, then the state of health mechanism can calculate the magnitude of the difference between the measured value and the expected value. Degrading more than the expected state of health is relative and is not strictly less than the expected value or more than the expected value. The relative state of health is determined with relation to the nature of the electrical component. For instance, electrical components that increase in resistance as it degrades will be deemed to have degraded more than the expected state of health when its measured resistance value is higher than the expected resistance value. Conversely, electrical components that decrease in output voltage as it degrades will be deemed to have degraded more than the expected state of health when its measured output voltage is lower than the expected output voltage.

If the measurement is higher than its corresponding expected value but the calculated difference between the measurement and the corresponding expected value is less than a threshold value, then the state of health mechanism can initiate a preventative measure, such as sending out a notification to an end user. The notification can be a warning that informs the end user that failure of the specific electrical component is likely to occur in the near future. This warning notification can cause the electrical component to be fixed and/or replaced sometime in the near future. However, if the difference is greater than the threshold value, then the state of health mechanism can initiate a more aggressive preventative measure, such as sending out a critical alert notification to the end user, informing the end user that failure of the specific electrical component is imminent or has already failed. In such cases, the critical alert message can cause the electrical component to be fixed immediately. The notification can be transmitted to an end user's device.

In some embodiments, the preventative measure can include modifying an operation of the energy generation system. For instance, if it is determined that the calculated difference is less than the threshold value, then the state of health mechanism can modify an operation of the electrical component in a way that mitigates the degradation of the electrical component to extend its lifetime until it is replaced. As an example, if the electrical component is a relay switch and the state of health mechanism determines that the measured resistance value of the switch is greater than expected but the difference between the measured resistance value and the expected resistance value is less than the threshold value, then the state of health mechanism can modify the voltage used to activate the switch so that the switching is more gradual and less instantaneous, thereby reducing stress on the relay switch. In additional embodiments, if it is determined that the calculated difference is more than the threshold vale, then the state of health mechanism can perform a more aggressive modification to the energy generation system. For instance, the state of health mechanism can disable the relay switch, or a portion of the energy generation system that uses the relay switch, if the difference between its measured resistance value and its expected resistance value is greater than the threshold value. Thus, instead of sending notifications, embodiments can also modify operations of the energy generation system in response to a determination that one or more electrical components are degrading more than expected.

This procedure can be more clearly understood by discussing LUT 1000 compared to hypothetical measurements in table 1001. With reference to FIG. 10B, at the end of year 1, a sensor can measure the gate voltage required to turn on a MOSFET transistor for an AI relay. In the illustrated example, the measurements is 9.7V. This measurements can then be compared to the corresponding expected gate voltage for the MOSFET at the end of year 1, which is 10V. The state of health mechanism can determine that the measured sensor value is less than the expected gate voltage, which means the current state of health of the MOSFET transistor is acceptable and is not degrading faster than expected. As a result, the state of health mechanism may not initiate preventative measures.

Each year thereafter, the sensor can measure the gate voltage of the MOSFET and compare the measurements to the expected value. For instance, at year 2 and year 3, the measured gate voltage is 10.1V and 10.8V, which are both less than their respective degradation rates from LUT 1000 of 10.5V and 11V. Thus, no preventative measures are initiated by the state of health mechanism during those years. However, at year 4, the measurements is 11.7V which is greater than the expected gate voltage of 11.5V, thereby indicating that it is degrading faster than expected. Thus, the state of health mechanism can calculate the difference in the two values, which results in a calculated result of 0.2V. This calculated difference can then be compared to a threshold value. The threshold value can be any suitable value that indicates that the electrical component is degrading faster than expected, but that failure is not imminent or has not yet occurred. It is to be appreciated that the threshold value can vary between electrical components. In this hypothetical, the threshold value is 0.5V. Thus, because the difference of 0.2V is less than the threshold value of 0.5V, then a preventative measure, such as sending a warning notification or modifying an operation of the energy generation system, can be initiated. Thereafter, at year 5, the measurement is 13V, which is greater than the expected gate voltage of 12V by 1V. The difference value of 1V is greater than the threshold voltage of 0.5V. Thus, the state of health mechanism can initiate a more aggressive preventative measure, such as sending a critical alert notification or disabling portion of an energy generation system. The critical alert notification can indicate that the electrical component's failure is imminent or has already fail, and thus cause the electrical component to be fixed immediately.

With respect to the other parameters in table 1001, the state of health mechanism will generate a warning notification in year 3 and a critical alert notification in year 4 for the capacitor, and the state of health mechanism will not initiate a preventative measure in the 5 years for the relay.

Although disclosures herein discuss only one threshold value, it is to be appreciated that embodiments are not so limited. Other embodiments can have more threshold values, each threshold value representing a different severity. For instance, a first threshold value can be a warning threshold value and a second threshold value can be a critical alert threshold value. In such instances, a warning notification may not be initiated until the difference between the measured parameter value and the expected value satisfies the warning threshold value, instead of just surpassing an expected value. Also, a critical alert modification may not be initiated until the difference satisfies the critical alert threshold value.

In some embodiments, the state of health mechanism can initiate a preventative measure based upon the difference between measurements from consecutive periods of time. For instance, a measurement at year 1 can be compared to a measurement at year 2. If the difference in measurements is greater than a threshold value, then a preventative measure can be initiated. By comparing two measurements from two consecutive periods of time, the state of health mechanism can determine whether an electrical component is rapidly degrading even though it has not degraded past an expected degradation value.

It is to be appreciated that the values in table 1001 are a collection of readings across a period of time and that methods of monitoring a state of health of an energy generation system with a state of health mechanism can occur in real time. Embodiments herein do not require the state of health mechanism to record a history of measurements, and encompasses embodiments where the state of health mechanism does not store measurements. In such instances, measurements are measured in real time, compared to the LUT, and then deleted after a determination has been made as to whether or not a preventative measure should be initiated. Furthermore, it is to be appreciated that the values in LUT 1000 do not have to be parameter values versus periods of time. Instead, LUT 1000 can establish an expected degradation rate based on parameter values versus other parameter values. For instance, instead of periods of time, parameter values can be referenced against temperature or any other type of parameter value. Moreover, although FIGS. 9-10B illustrate only one LUT for an energy generation system, embodiments are not limited to such configurations. An energy generation system can have a state of health mechanism that stores several different LUTs, each for a specific type of electrical component of the energy generation system.

Figure 11:
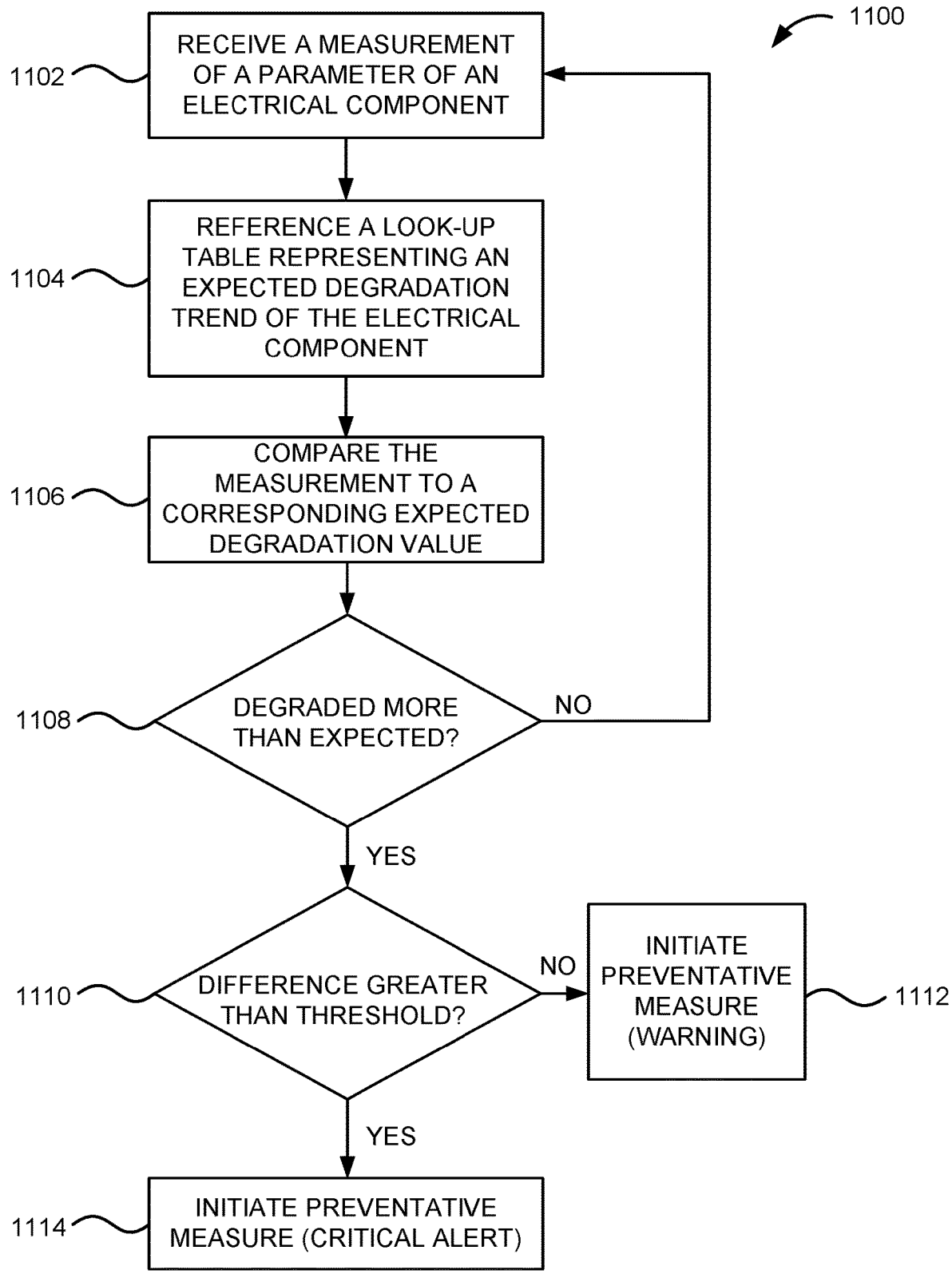
FIG. 11 is a flow chart illustrating a method for monitoring a state of health of an energy generation system with a state of health mechanism, according to some embodiments of the present disclosure.

III. Method of Monitoring a State of Health of an Energy Generation System With a State of Health Mechanism FIG. 11 illustrates a flow chart of an exemplary method 1100 for monitoring a state of health of an energy generation system with a state of health mechanism, according to some embodiments of the present disclosure. At block 1102 a measurement of a parameter of an electrical component is received. For instance, a parameter relating to the health of the electrical component is measured by a sensor, and the measured parameter is sent to and received by the state of health mechanism for the energy generation system, as discussed herein with respect to FIGS. 3 and 4. The sensor can be any type of sensor configured and designed to measure a state of health of the corresponding electrical component, as discussed herein with respect to FIGS. 5-8.

At block 1104, the state of health mechanism can reference a LUT representing an expected degradation trend of the electrical component, as discussed herein with respect to FIGS. 9-10B. The degradation trend can be designated by a manufacturer of the corresponding electrical component. According to some embodiments of the present disclosure, the LUT can include degradation trends of several electrical components.

Thereafter, at block 1106, the measured parameter is compared to a corresponding expected degradation value in the LUT. For instance, the instance in time at which a parameter value is measured is compared to an expected degradation value for a period of time corresponding to the instance in time at which the parameter is measured, as discussed herein with respect to the hypothetical referenced in FIGS. 10A and 10B. It is then determined at block 1108 whether the electrical component has degraded more than expected. If the measured parameter value has not degraded more than expected, then the method continues back to receive another measurement of the parameter of the electrical component at block 1102, as mentioned herein with respect to FIGS. 10A and 10B. In some instances, the measurement is received at a following period of time designated by the LUT.

If, however, the measured value has degraded more than expected, then a difference between the measured parameter value and the expected parameter value can be calculated. At block 1110, it can be determined whether this difference is greater than a threshold value. The threshold value can be any suitable value that indicates that the electrical component is degrading faster than expected, but that failure is not imminent or has not yet occurred, as discussed herein with respect to FIGS. 10A and 10B. If the difference is not greater than the threshold value, then at block 1112, a preventative measure can be initiated, such as issuing a warning notification to an end user and causing the electrical component to be repaired/replaced sooner than expected, or modifying an operation of the energy generation system to mitigate degradation of the electrical component until the electrical component can be repaired/replaced. If the difference is greater than the threshold value, then at block 1114, a different, more severe preventative measure can be initiated, such as issuing a critical alert notification and causing the electrical component to be repaired/replaced immediately, or modifying an operation of the energy generation system, e.g., disable the electrical component or disable a portion of the energy generation system that uses the electrical component, as discussed herein with respect to FIGS. 10A and 10B.

Although the invention has been described with respect to specific embodiments, it will be appreciated that the invention is intended to cover all modifications and equivalents within the scope of the following claims.

What is claimed is:

1. A method of determining a state of health for a photovoltaic (PV) energy generation system, the method comprising:
receiving a measurement of a parameter of a switching element in the PV energy generation system at an instance in time;
referencing a look-up table containing several values of the parameter representing an expected degradation trend across a progression of time for the switching element;
comparing the measurement to an expected value of the expected degradation trend for a period of time corresponding to the instance in time;
determining a performance the switching element is degrading at a rate that exceeds the expected degradation trend by a threshold value based on the comparing; and
changing an amount of energy used to activate the switching element based upon the degradation rate exceeding the threshold value.

2. The method of claim 1, wherein changing the amount of energy used to activate the switching element comprises modifying the voltage used to activate the switching element so that switching is more gradual and less instantaneous.

3. The method of claim 1, wherein the threshold value is a first threshold value and the method further comprises determining whether the degradation rate exceeds a second threshold value greater than the first threshold value; and the method further comprises disabling the switching element in response to the degradation rate exceeding the second threshold value.

4. The method of claim 1, wherein the switching element is a metal oxide semiconductor field effect transistor (MOSFET), an electromechanical switch or a relay switch.

5. The method of claim 1, wherein the switching element is part of an inverter or an energy storage device for the PV energy generation system.

6. The method of claim 1, wherein the expected degradation trend comprises a progression of more than one period of time.

7. A photovoltaic (PV) energy generation system, comprising:
an inverter configured to receive direct current (DC) power from a PV module, the inverter comprising:
circuitry configured to convert between DC and alternating current (AC) power;
an electrical component for enabling the circuitry to convert between DC and AC power, wherein the electrical component is a switching element, a capacitor or a relay;
one or more sensors coupled to the electrical components for monitoring a parameter of each electrical component; and
a state of health mechanism coupled to the inverter, the state of health mechanism comprising:

a processor coupled to the one or more sensors and configured to receive sensor information from the one or more sensors: and memory coupled to the processor; the memory containing instructions that, when executed, causes the processor to:
- receive a measurement of a parameter of the electrical component in the PV energy generation system at an instance in time;
- reference a look-up table containing several values of the parameter representing an expected degradation trend across a progression of time for the electrical component;
- compare the measurement to an expected value of the expected degradation trend for a period of time corresponding to the instance in time;
- determine a performance of the electrical component is degrading at a rate that exceeds the expected degradation trend by a threshold value based on the comparison; and
- change an operation of the electrical component based upon the degradation rate exceeding the threshold value.

8. The system of claim 7, wherein the state of health mechanism is incorporated within a housing of the inverter.

9. The system of claim 7, wherein the electrical component is a switching element and the change of operation of the electrical component comprises changing an amount of energy used to activate the switching element.

10. The system of claim 7, wherein the electrical component is a switching element and the change in operation of the electrical component comprises changing an amount of energy used to activate the switching element.

11. The system of claim 7, wherein the threshold value is a first threshold value and the method further comprises determining whether the degradation rate exceeds a second threshold value greater than the first threshold value; and
wherein the change in operation is a first change when the degradation rate is between the first and second thresholds and the change in operation is a second change different from the first change when the degradation rate exceeds the second threshold value.

12. The system of claim 11, wherein the first change is a modification of the operation of the electrical component and the second change is to shutdown operation of the electrical component.

13. A computer product for a photovoltaic (PV) energy generation system comprising a non-transitory computer readable medium storing a plurality of instructions that when executed control a device including one or more processors, the instructions comprising:
- receiving a measurement of a parameter of a switching element in the PV energy generation system at an instance in time;
- referencing a look-up table containing several values of the parameter representing an expected degradation trend across a progression of time for the switching element;
- comparing the measurement to an expected value of the expected degradation trend for a period of time corresponding to the instance in time;
- determining a performance of the electrical component is degrading at a rate that exceeds the expected degradation trend by a threshold value based on the comparing; and
- changing an amount of energy used to activate the switching element based upon the degradation rate exceeding the threshold value.

14. The computer product of claim 13, wherein the change in operation of the switching element is made to extend a useful life of the electrical component.

15. The computer product of claim 13, wherein the threshold value is a first threshold value and the memory further causes the processor to determine whether the degradation rate exceeds a second threshold value greater than the first threshold value; and wherein the change in operation is a first change when the degradation rate is between the first and second thresholds and the change in operation is a second change different from the first change when the degradation rate exceeds the second threshold value.

* * * * *